(12) United States Patent
Matignon et al.

(10) Patent No.: US 8,554,711 B2
(45) Date of Patent: Oct. 8, 2013

(54) CONTEXTUAL DECISION LOGIC ELICITATION

(75) Inventors: Carole-Ann Matignon, San Jose, CA (US); Carlos Serrano-Morales, Sunnyvale, CA (US)

(73) Assignee: Sparkling Logic Inc., San Jose, CA (US)

( * ) Notice: Subject to any disclaimer, the term of this patent is extended or adjusted under 35 U.S.C. 154(b) by 212 days.

(21) Appl. No.: 13/187,371

(22) Filed: Jul. 20, 2011

(65) Prior Publication Data
US 2012/0023056 A1 Jan. 26, 2012

Related U.S. Application Data

(60) Provisional application No. 61/366,141, filed on Jul. 20, 2010.

(51) Int. Cl.
G06F 17/00 (2006.01)
G06N 99/00 (2010.01)

(52) U.S. Cl.
CPC .................................. G06N 99/005 (2013.01)
USPC ........................................................ 706/45

(58) Field of Classification Search
None
See application file for complete search history.

(56) References Cited

U.S. PATENT DOCUMENTS

| 6,684,192 | B2 | 1/2004 | Honarvar et al. |
| 6,708,155 | B1 | 3/2004 | Honarvar et al. |
| 6,876,991 | B1 | 4/2005 | Owen et al. |
| 7,321,883 | B1 * | 1/2008 | Freedy et al. .................... 706/45 |
| 7,401,059 | B1 | 7/2008 | Owen et al. |
| 7,596,538 | B1 | 9/2009 | Owen et al. |
| 2002/0091687 | A1 | 7/2002 | Eglington |
| 2005/0091012 | A1 | 4/2005 | Przytula et al. |
| 2006/0111933 | A1 | 5/2006 | Wheeler |
| 2007/0027919 | A1 | 2/2007 | Mastel |
| 2007/0168308 | A1 | 7/2007 | Wang et al. |
| 2008/0208786 | A1 | 8/2008 | Serrano-Morales et al. |

OTHER PUBLICATIONS

International Search Report and Written Opinion dated Nov. 23, 2012 for PCT Application No. PCT/US2011/044748.
Davenport and Harris; "Automated Decision Making Comes of Age", MITSload, Management Review, Jul. 15, 2005. Accessed Jul. 24, 2013. http://sloanreview.mit.edu/article/automated-decision-making-comes-of-age/.
Power, "Characteristics of DSS." Decision Support Systems. Westport, CT: Quorum Book, 2002. 6. Print.
Power, "Henry Morris Interview: Decision Support and Analytic Applications", Dec. 3, 2006, Accessed on Jul. 21, 2013. http://dssresources.com/interviews/morris/morris12032006.html.

(Continued)

Primary Examiner — Alan Chen
(74) Attorney, Agent, or Firm — The Mueller Law Office, P.C.

(57) ABSTRACT

The present invention is a method of creating decision logic. A first set of rules for the decision logic is received. The user is queried for data and this data is stored in a memory. A first decision is generated for a user based at least in part on the data. Input is received from the user for editing the first set of rules to create a new set of rules for the decision logic in the context of data. A final decision is generated derived at least in part from the data using the new set of rules.

23 Claims, 15 Drawing Sheets

(56) References Cited

OTHER PUBLICATIONS

Power, "What is decision automation?", DSS News, Jul. 4, 2004, vol. 5, No. 14, DSSREsources.Com, Accessed on Jul. 24, 2013. http://tx.liberal.ntu.edu.tw/TxComm/&InfoMgt/Literature/IDSS/decision%20automation.txt.

Samild, "Decision Support Versus Decision Automation", Analyst First, Jun. 23, 2011. Access on Jul. 24, 2013. http://analystfirst.com/2011/06/23/135/decisionsupport-versus-decision-automation/.

Taylor and Raden, "Characteristics of Decision-Making Problems", Smart (enough) Systems: How to Deliver Competitive Advantage by Automating the Decisions Hidden in Your Business, Upper Saddle River, NJ: Prentice Hall, 2007. 48-49. Print.

* cited by examiner 362          360        364

PATIENT #0234567                              PROCESS CASE

Food Allergy Pre-Screening Test
Complete the following form to determine whether a visit to a food allergist would be a good idea. Take the form with you to your family doctor or allergist to assist in your diagnosis.
I have the following symptoms a couple minutes to 2 hours after eating or drinking:

| Symptom | Food or Beverage | Amount consumed |
|---|---|---|
| ☐ Tingling or itching in and around the mouth | | |
| ☐ Swelling of the tongue and throat | | |
| ☐ Flushing of the face or neck | | |
| ☐ Rash | | |
| ☐ Eczema | | |
| ☐ Hives and swelling | | |
| ☐ Vomiting | | |
| ☐ Abdominal cramps | | |
| ☐ Diarrhea | | |
| ☐ Wheezing | | |
| ☐ Difficulty breathing | | |
| ☐ Drop in blood pressure (feeling faint or weak) | | |
| ☐ Loss of consciousness | | |

Symptoms commonly arise within ___ (minutes/hours) after eating or drinking and last ___ (minutes/hours) after eating or drinking.
I first noticed these symptoms ___ (days/months/years ago)
I have had similar symptoms ___ times in the past.
I have treated my reactions with: ___, ___, ___, with the following results:

DIAGNOSIS ON __/__/__ _____
RATIONALE: _____

*FIG. 3*

PATIENT #0234567    470  PROCESS CASE

460

462

Complete t
be a good
in your dia
I have the

☐ Tin
  and
☐ Swe
  and
☐ Flu
  nec
☐ Ras
☐ Ecz
☐ Hiv
☐ Vo
☐ Ab
☐ Dia
☐ Wh
☐ Dif
☐ Dra
  (fe
☐ Los Patient #0234567

Context: "Diagnosis" decision
Current decision results:
  No decision result has been To set the result of the "Diagnosis" decision, select them on the Tell us what Diagnosis sould be set
Diagnosis:_____
(Note: In general, Rationale is also used as a result of the "Diagnosis" decision)

Page 1

Symptoms commonly arise within ___ (minutes/hours) after eating or drinking
and last_____(minutes/hours) after eating or drinking.
I first noticed these symptoms ____ (days/months/years ago)
I have had similar symptoms ____ times in the past.
I have treated my reactions with:_____,_____,_____, with the
following results:

DIAGNOSIS ON __/__/__
RATIONALE:_____

FIG. 4

PATIENT #0234567

Food Allergy Pre-Screening Test

Complete the following form to determine whether a visit to a food allergist would be a good idea. Take the form with you to your family doctor or allergist to assist in your diagnosis.
I have the following symptoms a couple minutes to 2 hours after

| Symptom | Food or Beverage | Amount co... |

☐ Tingling or itching in and around the mouth
☐ Swelling of the tongue and throat
☐ Flushing of the face or neck
☐ Rash
☐ Eczema
☐ Hives and swelling
☐ Vomiting
☐ Abdominal cramps
☐ Diarrhea
☐ Wheezing
☐ Difficulty breathing
☐ Drop in blood pressure (feeling faint of week)
☐ Loss of consciousness Symptoms commonly arise within ___ (minutes/hours) after and last ___ (minutes/hours) after eating or drinking.
I first noticed these symptoms ___ (days/months/years) a...
I have had similar symptoms ___ times in the past.
I have treated my reactions with: ___
following results: ___

DIAGNOSIS ON ___ / ___ / ___
RATIONALE:

---

PROCESS CASE — 560

Patient #0234567

Context: "Diagnosis" decision
Current decision results:
No decision result has been assigned To set the result of the "Diagnosis" decision:

Tell us what Diagnosis sould be set to:
Diagnosis:

[h] Note: This field is used as the result of the "Diagnosis" decision in other rules
(Note: In general, Rationale is also used as a result of the "Diagnosis" decision)

[f] To set the circumstances under which the result of the "Diagnosis" decision is set as above, select the fields that justify it in the form
Tell us when "Tingling or aching in and around the mouth" leads to the result:
 - Is it's presence?
 - Is it's absence?
 - Do you want to keep track of this and not use it yet?
 - Do you want to get information from the system on its relevance?
Note: This field is used as a filter in the "Diagnosis" decision in less than 5% of the rules. It is always used with "Swelling of the tongue and Throat".

[h] Note: For the current documents set, this field is tested only in rules that lead to the "major sugar allergy" result Page 1

FIG. 5

PATIENT #0234567

PROCESS CASE

Food Allergy Pre-Screening Test

Complete the following form to determine whether a visit to a food allergist would be a good idea. Take the form with you to your family doctor (in your diagnosis.
I have the following symptoms a couple minutes to 2 hours af

| Symptom | Food or Beverage | Amoun |
|---|---|---|
| ☐ Tingling or itching in and around the mouth | | |
| ☐ Swelling of the tongue and throat | | |
| ☐ Flushing of the face or neck | | |
| ☐ Rash | | |
| ☐ Eczema | | |
| ☐ Hives and swelling | | |
| ☐ Vomiting | | |
| ☐ Abdominal cramps | | |
| ☐ Diarrhea | | |
| ☐ Wheezing | | |
| ☐ Difficulty breathing | | |
| ☐ Drop in blood pressure (feeling faint of week) | | |
| ☐ Loss of consciousness | | |

Symptoms commonly arise within ____ (minutes/hours) and last ____ (minutes/hours) after eating or drinkin
I first noticed these symptoms ____ (days/months/yea
I have had similar symptoms ____ times in the past.
I have treated my reactions with: ____

DIAGNOSIS ON ___/___/___
RATIONALE:

---

Patient #0234567 — 770

Context: "Diagnosis" decision
Current decision results:
No decision result has been assigned You have selected to
   Set Diagnosis to: "Major Honey Allergy"
When
   Tingling or aching around the mouth is present and severe
and
   Patient noticed the symptom after eating "Honey"

☒ The system will track

Cases where Tingling or aching in and around the mouth is present and mild
   and where Diagnosis is "Major Honey Allergy"
   Cases where Diagnosis is "Sugar Allergy"
   Cases where Diagnosis is "Major Honey Allergy"
   and where age of patient is between 10 and 21 years old The system will notify on Cases where Diagnosis is "Major Honey Allergy"
   and where Patient's Medical History contains "Diabetes"

Page 3

CONTEXTUAL DECISION LOGIC ELICITATION

CROSS REFERENCE TO RELATED APPLICATIONS

This application claims priority benefit to U.S. Provisional Application No. 61/366,141, entitled "Contextual Decision Logic Elicitation" filed Jul. 20, 2010, which is incorporated by reference in its entirety herein as if it was put forth in full below.

BACKGROUND OF THE INVENTION

Capturing decision logic is a mandatory activity of any decision automation project. Ultimately, business users want to be empowered and allowed to create and maintain business rules without technical assistance.

The complexity of decision logic elicitation stems from the fact that Subject Matter Experts (SMEs) are forced to think exhaustively about any and all rules that govern their business. This activity not only requires a lot of time but is also foreign to most SMEs because it is out of the realm of their normal day-to-day workflow. More often than not, incomplete decision logic which does not reflect how the business effectively operates is made, then several iterations are required to complete the process. This elicitation process does not guarantee that the resulting logic is in line with the company's business objectives.

In the prior art, the approaches to solve this issue have relied on heavy up-front investment along with long and wide preparation phases to mitigate the risk. Some examples include the creation of centers of excellence, the involvement of scarce and expensive specialists from vendor firms and the use of System Integrators (SIs) which is a person or company that specializes in bringing together component subsystems into a whole and ensuring those subsystems function together.

Some companies have developed a business around decision logic capture using methodology or software. Such solutions guide SMEs through the elicitation process to translate requirements into a form that is closer to a business rules format. In these solutions, the requirements represent the source business rules to be encoded.

Companies have also developed various systems based on using decision metaphors, rule templates, case-based reasoning, expert interviewing, or ripple-down rule creation. Decision metaphors are used to represent rules in a more graphical form, for example, decision trees, decision table, decision graph, decision flow, or scorecard. In certain circumstances, these are easy to manipulate by business users. The rule templates approach provides business users with specific tailored applications that enable the user to have an application specific view on decisions. The case-based reasoning approach relies on a large database of solved cases against which new cases are compared allowing the selection of closest cases and the assignment of the corresponding decision result. Expert interviewing constructs decisions through successive interviews of experts following one or another methodology. Finally, the approach using ripple-down rules uses cases to gradually refine an exception-based directed acyclic graph of conditions ending in actions that define a decision.

SUMMARY OF THE INVENTION

The present invention is a method of creating decision logic. A first set of rules for the decision logic is received. The user is queried for data and this data is stored in a memory. A first decision is generated for a user based at least in part on the data. Input is received from the user for editing the first set of rules to create a new set of rules for the decision logic in the context of the data. A final decision is generated derived at least in part from the data using the new set of rules.

The present invention is better understood upon consideration of the detailed description below in conjunction with the accompanying drawings and claims.

BRIEF DESCRIPTION OF THE DRAWINGS

FIG. 3 depicts a form-based data collection technique.

FIG. 4 depicts a wizard user interface.

FIG. 5 shows the wizard tool providing the user with guidance.

FIG. 7 depicts the wizard tool enabling the user to create or subscribe to decision results and business outcome metrics.

FIG. 9 is a form-based interface for the Automobile Insurance Redpen Edit Mode example.

FIG. 10 depicts creating a new rule in the Redpen edit mode for the Automobile Insurance Redpen Edit Mode example.

FIG. 13 illustrates the metrics of implementing the new rule compared to the previous rule for the Automobile Insurance Redpen Edit Mode example.

DETAILED DESCRIPTION OF THE EMBODIMENTS

The following description is presented to enable a person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims. Reference now will be made in detail to embodiments of the disclosed invention, one or more examples of which are illustrated in the accompanying drawings.

The present invention provides an effective solution to the creation and capturing of decision logic in the context of every day operations by a business analyst user without forcing a change in his or her workflow while providing explanations as the decision results. The invention also focuses the SME's attention on Key Performance Indicators (KPIs) and previous decision logic that increase the quality of the captured decision logic. The invention helps reduce costs, reduce business cycles, and provide less rigid automated decision lifecycles. The invention does not require significant setup, is not specific to certain types of decisions, and does not require experts to create the decision logic.

Figure 1:
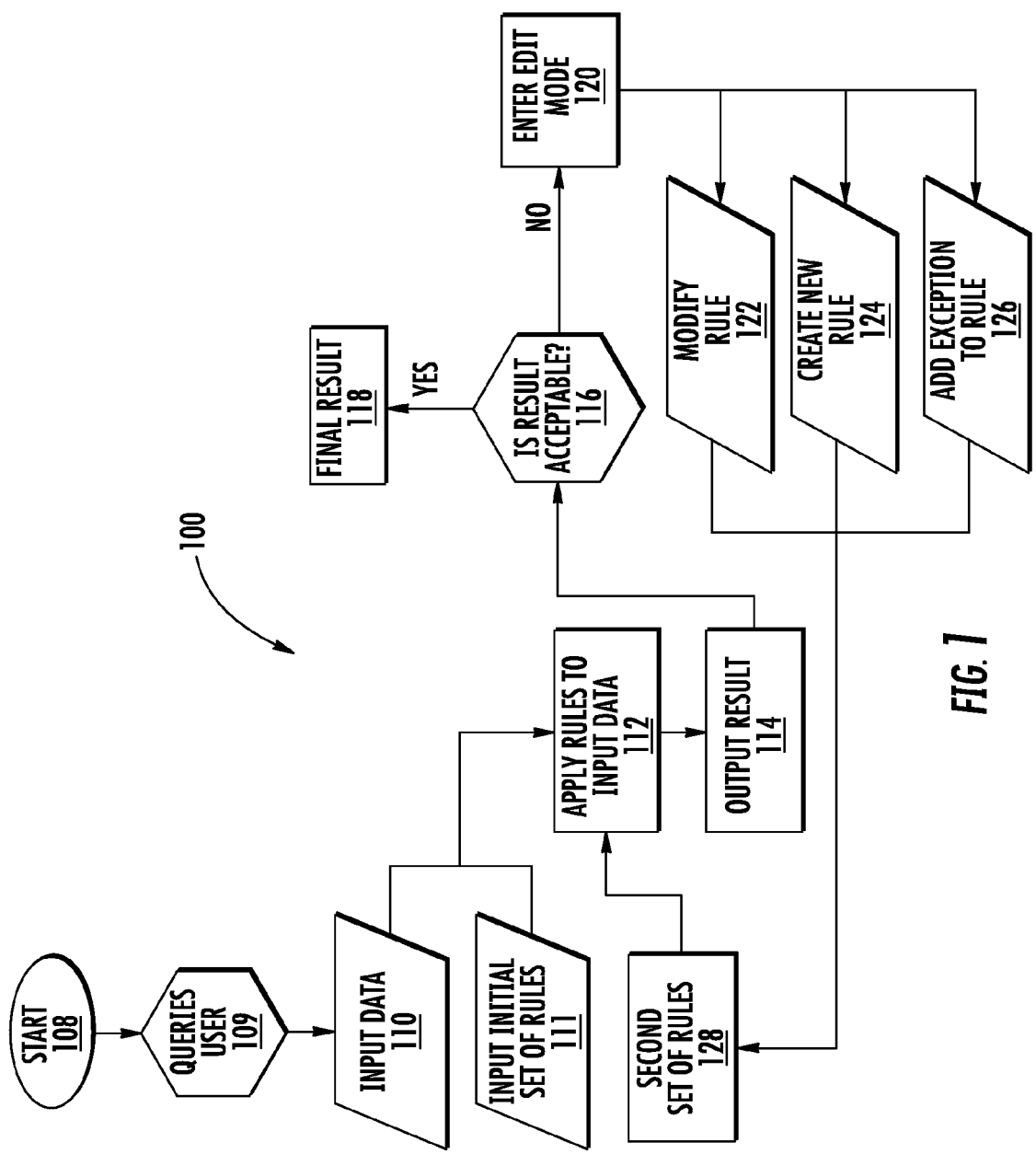
FIG. 1 illustrates a flowchart of the overall process of the present invention.

FIG. 1 illustrates a flowchart of the overall process of the present invention. The process 100 starts at step 108. At step 109, the form-based interface queries a user for data and an initial set of rules. The user inputs data at step 110, and user inputs the initial set of rules at step 111. Note that step 111 may take place before step 110. Next, rules are applied to the data at step 112 and an output result is created at step 114. The output result is derived from the set of rules inputted at step 111. The user then has the option to accept the output result at step 116. If the output result is accepted by the user, this becomes a final result at step 118 and the process (or this stage of a large process) is complete.

If the user chooses not to accept the output result at step 116, the user may alter the output result by manipulating the initial set of rules in an edit mode at step 120. In this edit mode, the user may (i) modify an existing rule in the first set of rules at step 122, (ii) create a new rule in the first set of rules at step 124 and/or (iii) add an exception to an existing rule in the first set of rules at step 126. As a result, a second set of rules is provided at step 128. The input data is then applied to the second set of rules at step 112, and another output result is generated at step 114. Again, the user has the option to accept the output result at step 116. If the user accepts these output results, the process ends. The user may also manipulate the second set of rules again via steps 122, 124 and 126 after entering the edit mode at step 120. The method 100 continues in like fashion until the user accepts the output result at step 118 and the process ends.

Figure 2A:
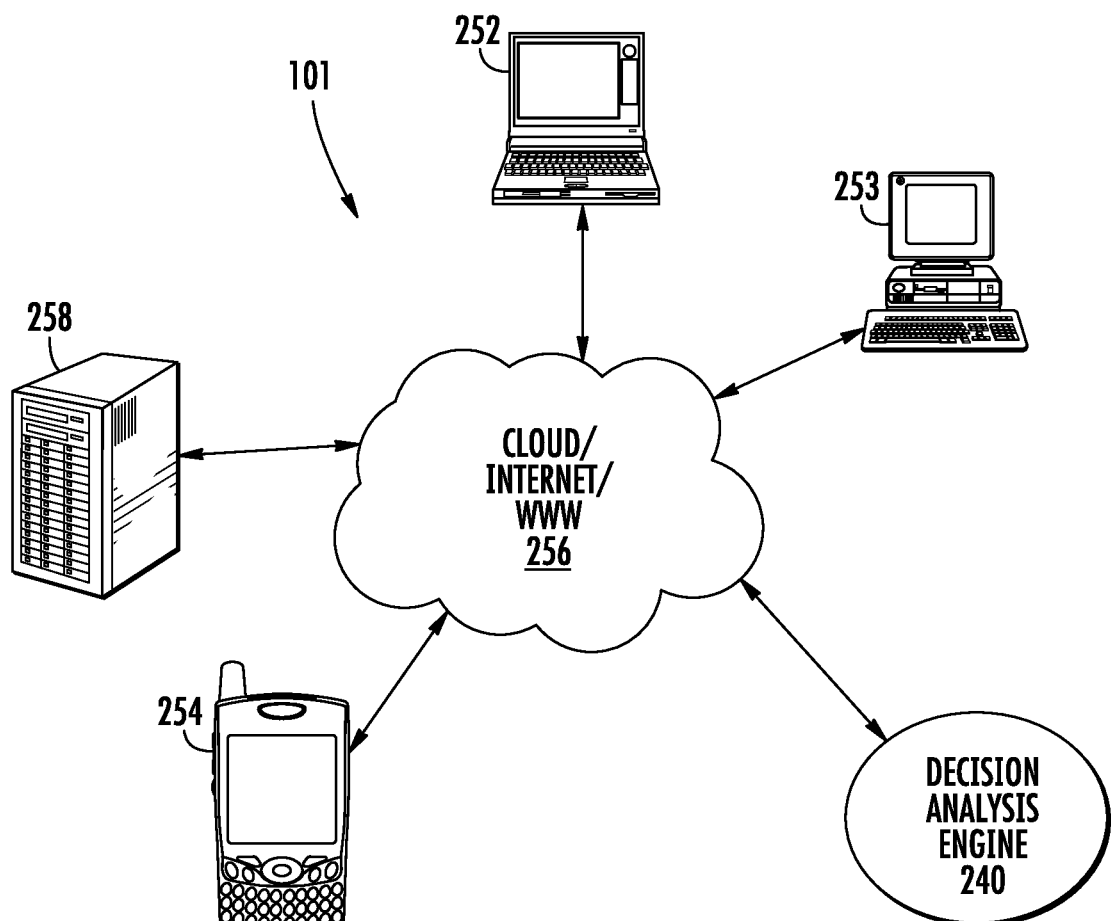
FIG. 2A depicts a communication system diagram of the present invention.

FIG. 2A shows a communication system diagram incorporating an embodiment of the present invention. The communication system 101 generally includes a cloud service server (the server) 258, a variety of electronic devices 252, 253 and 254 and the decision analysis engine 240. The components 252-254 generally communicate through the Internet, the World Wide Web (Web) or a network "cloud" (the cloud) 256, except where it is appropriate or more convenient to use another communication technique as described herein.

The Internet is generally a global data communications system. It is a hardware and software infrastructure that provides connectivity between computers. In contrast, the Web is generally one of the services communicated via the Internet. It is generally a collection of interconnected documents and other resources, linked by hyperlinks and URLs. In many technical illustrations when the precise location or interrelation of Internet resources is not important, extended networks such as the Internet are often depicted as a cloud (e.g. 256 in FIG. 2A). The verbal image has been formalized in the newer concept of cloud computing. The National Institute of Standards and Technology (NIST) provides a definition of cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web and cloud computing are not exactly the same, these terms are generally used interchangeably herein, and they are referred to collectively as the cloud 256.

The electronic devices 252-254 are generally any appropriate devices that have access to the cloud 256, such as personal computers (workstation, desktop, laptop, tablet or iPad), cell phones (e.g. 254), Kindles, Blackberrys, iPhones, iPods, other PDAs (personal digital assistants), and many others. These devices 252-254 are preferably feature-rich with respect to communication capabilities, i.e. have built in capabilities to access the cloud 256. The electronic devices 252-254 generally preferably access any part of the cloud 256 through industry standard wired or wireless access points, cell phone cells or network nodes.

The server 258 is generally any appropriate computer or bank of computers operating server programs that enable access via the cloud 256 to data and applications stored or running therein. The server 258 generally implements the features that enable the electrical devices 252-254 to communicate with the cloud-based applications.

Figure 2B:
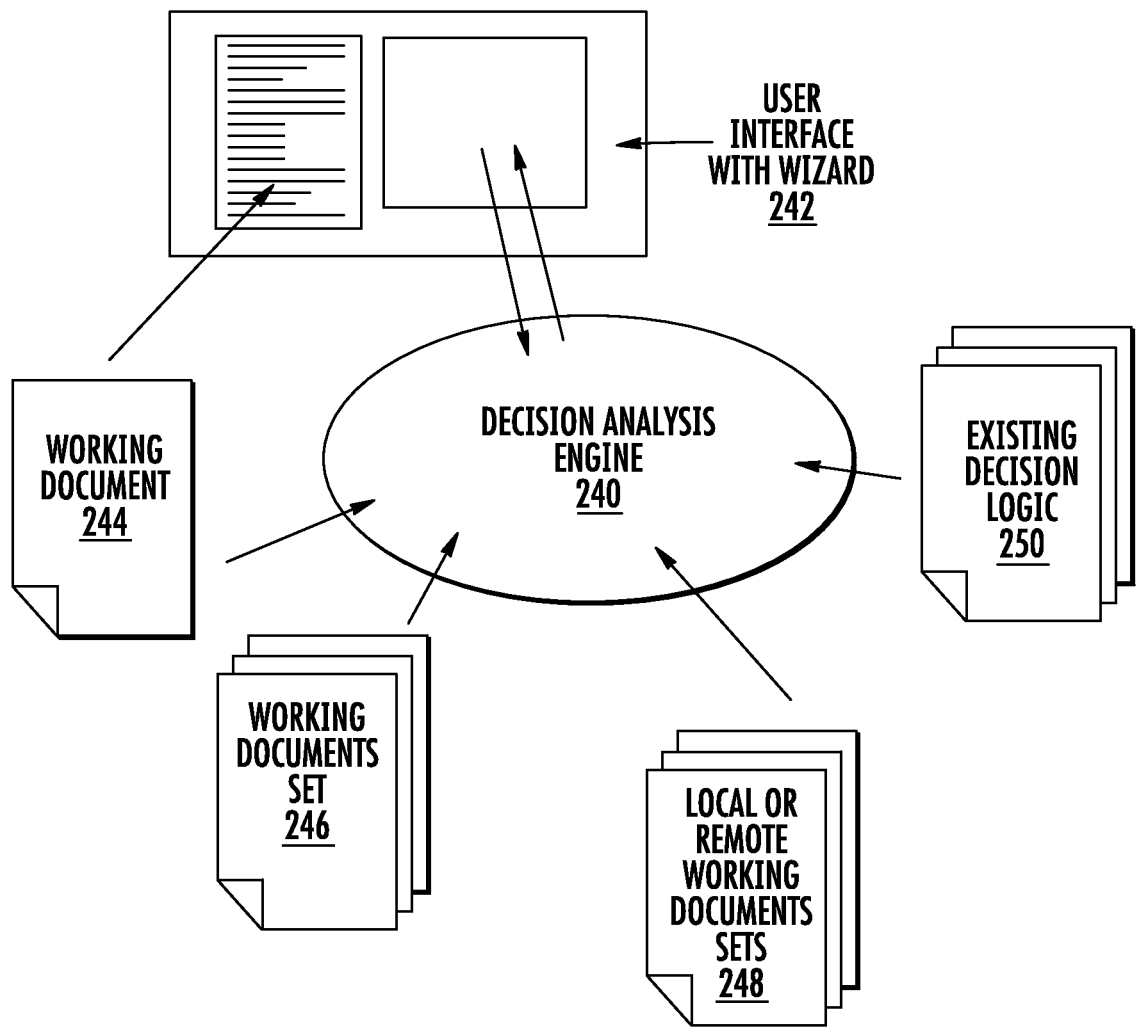
FIG. 2B shows the decision analysis engine interfacing with the various components.

The decision analysis engine 240 interfaces with the various components as described in FIG. 2B. FIG. 2B shows one embodiment of an overall structure of the present system. At the center of FIG. 2B, is the decision analysis engine 240 which interfaces with the various working documents 244, 246 and 248, the existing decision logic 250, and the user interface 242. The various working documents may be a working document 244 or a working document set 246, and may be located locally with the user or remotely 248.

FIG. 3 depicts one embodiment of the present system which is a form-based user interface 360. Form 360 may be similar or equal to the form used for managing the cases on which a decision is to be made. The interface allows the user to use form 360 to manipulate, for example one by one, all the working documents 244 (refer to FIG. 2B) within a documents set 246. It also allows the user to view the impact of automated and manual decisions on the documents in the documents set, primarily in terms of distribution of decision results and long term business outcomes. In one embodiment of the present system, the user may input data onto the form. In another embodiment of the present system, the inputted data on the form is generated from other data sources, internally or externally, such as a process, program or database.

The user may be presented with context 362 extracted from masses of cases that have been processed by the user or the set of users within their community. Context 362 may also be considered business rules for decision logic. The sources for context 362 includes, but is not limited to, information such as typical case segmentation, usual case processing, usual fields in the form that play a part in the decisions made by the rest of the users within their community, what type of role they play, and with which relevance. In one embodiment of the present system, the user may input a first set of rules to create the initial decision logic and present that information as the context to the user.

In other embodiments, a first set of rules 362 may be inputted internally or by multiple users working separately or collaboratively. In another embodiment, the first set of rules 362 and/or the second set of rules may be inputted by at least one user using near natural language for example, free text. In further embodiments, first set of rules 362 may be inputted externally, for example, by a wizard, an XML instruction file, a process, a workflow diagram, a program, a list of predetermined logical expressions or database. The second set of rules may also be inputted externally, for example, at least in part, by a list of predetermined logical expressions.

The user is presented with the option to process the case by manipulating the content of form 360 by editing. In one embodiment, a Redpen editing mode is used in which the user may electronically annotate (i.e. highlight or click) onto data displayed in the user interface to modify any automated rule initially provided, create a new rule thus adding a rule, or create an exception rule (refer also to FIG. 1; steps 122, 124, 126). The content of form 360 includes data 364 with a range or set of values in contextual fields. For example, referring to FIG. 3, a food allergy example, the user is queried for symptoms, the type of food or beverage consumed and the amount consumed. The user may manipulate the content of form 360 using electronic annotation in various ways, including but not limited to, circling, clicking, typing, or highlighting. The system may also present a range or set of values for the relevant contextual fields on the form.

To aid the user through the process, a software wizard tool or setup assistant may be used. This wizard tool is a user interface type that presents a user with a sequence of dialog boxes and leads the user through a series of well-defined steps. In other embodiments, the user may be guided through by drop-down menus or by an expert system which guides a user through a series of yes/no questions. Other commercially available techniques may be used to walk the user through the options.

FIG. 4 depicts one embodiment of the present system of a wizard user interface 470 (also referred to as the wizard) that guides the user through the process of selecting directly within original form 460, contextual fields 462 that are important to focus on. Wizard 470 guides the user through the process of configuring the role that relevant contextual fields play within the decision being modified or created. The system displays the role and importance of those contextual fields based on automated decisions or decision logic implemented at that point. The system then displays to the user which contextual fields on form 460 are important for the user to focus on, for example, by highlighting the relevant contextual fields with color-coding. This color-coding represents whether the field is used in rule conditions, actions or both, as well as quantitative feedback on the frequency of usage in the decision logic implemented at that point.

In one embodiment, the wizard first focuses on guiding the user toward the definition of what the decision result is, and how the decision logic implemented at that point leads to this business outcome. The wizard suggests to the user the contextual fields to use as part of the result based on automated decisions implemented at that point. The user adds contextual fields to include in the decision logic to be modified or added by selecting those fields in the context of the form. This is an important aspect of the invention as all existing decisioning systems require the user to type or select attributes in the abstract, in absence of data.

FIG. 5 shows how wizard 570 then provides the user with guidance in terms of what can be done with contextual fields 562 in order to make it contribute to the decision. This guidance is translated in terms of questions, and potentially, in terms of prompts 580 to test the result of computations on contextual field 562. The system will store the responses by the user in memory or persistent storage for future use. This memory or persistent storage may be located remote from the user devices. In one embodiment, this memory or persistent storage may be located in cloud service server 258 (refer to FIG. 2A).

The system analyzes the automated and manual decisions to identify potential logic issues. For example, but not restricted to these examples, it can recognize potential contradictions, repetitions, logical overlaps, or logical gaps. Contextual data available in the document set is analyzed by the system to detect inconsistencies due to the decision logic being modified or added to the decision logic implemented at that point. Contextual data may be forms, data sets, decision trees and graphs or business rules. In contrast, regular data may be the type included as text in a form, such as personal data on an application. The system also detects changes in decision logic that cause dramatic drifts in performance metrics based on the provided document set. The wizard provides guiding information to the user as to whether the logic being constructed is verified to be logically consistent. If inconsistencies exist, the wizard provides corresponding guidance to the user to resolve the possible issue. This feature of being able to promptly identify abnormalities is an important aspect of the present invention. In currently available systems, only logical contradictions may be recognized at the time of authoring; most contradictions can only be recognized after the business rule is established in production systems which may take weeks or months.

The user may determine what role, and the relevance of that role, of a particular contextual field in the output results. Wizard 570 may provide guiding information to the user as to the role of the contextual field in the decision, and how relevant that role is in determining the decision results as well as usage information to gauge the importance and correlation of those fields with the decisions 582.

The user has the ability to query the system for further detailed information. For example, but not restricted to this example, the user can ask what the best segmentation is for the values of a given contextual field for the purposes of satisfying certain decision results constraints.

Figure 6:
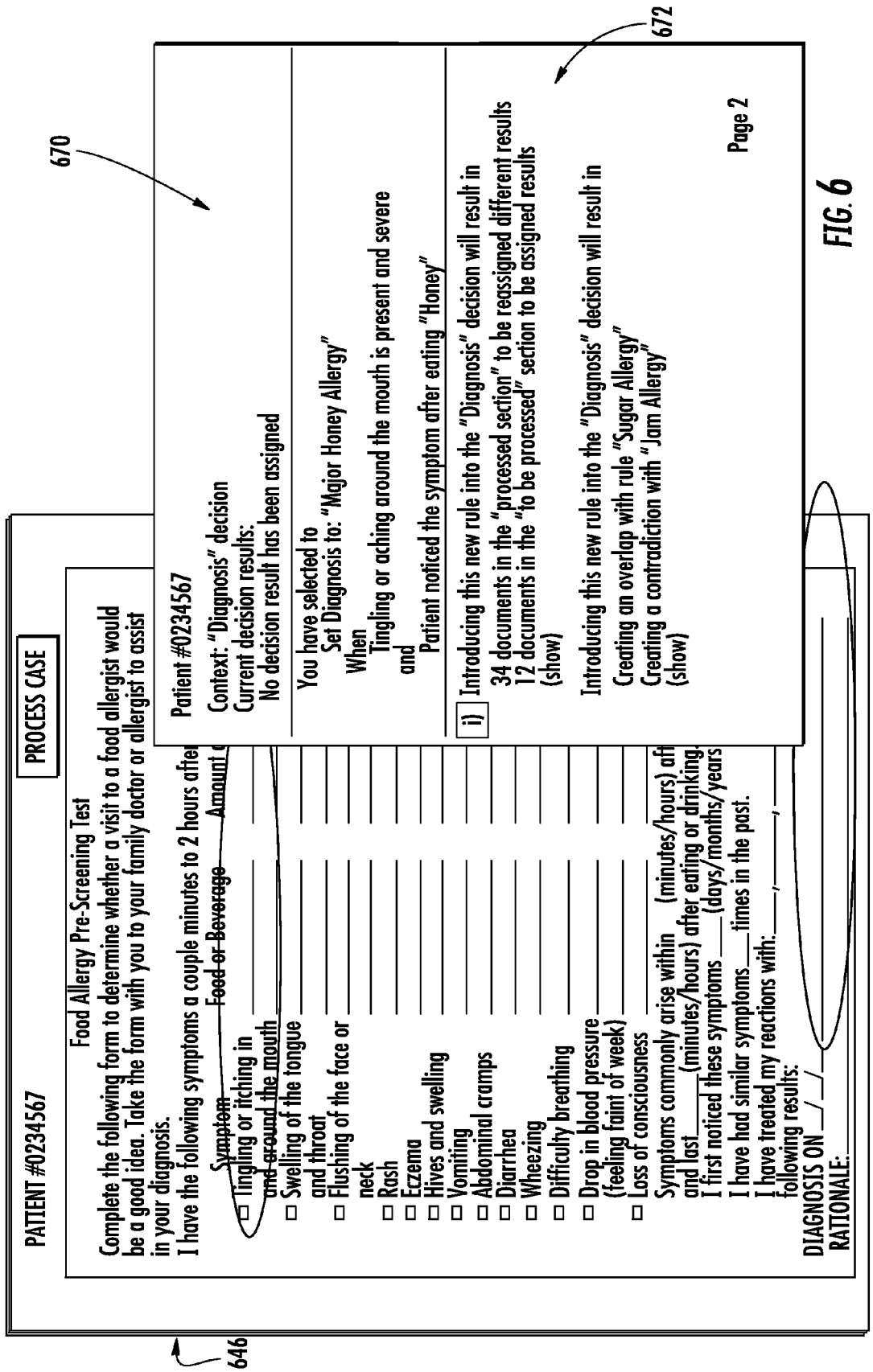
FIG. 6 illustrates the wizard tool providing immediate feedback on the impact of the change.

FIG. 6 illustrates how wizard 670 provides immediate feedback on the impact of the change in the decision logic on all documents in the document set 646 the user is utilizing in section 672. Also, the user may query to determine the corresponding impact on any relevant document set managed in the system. The impact may be presented graphically or in data list forms, for example, by tables, charts, decision trees or another method.

The majority of the new business rules generated by the system are based on the response to the queries by the user during the guidance process. The rules are aggregated from one or multiple users using the system over a period of time. The new set of rules applied by the user may be saved in a centralized repository, for example, in a cloud service server 258 (refer to FIG. 2A), so that future queries are handled using the new revised set of rules. In one embodiment, the pending working documents accessing the centralized repository will not be impacted, but all future working documents and electronic requests will be handled using the new set of rules applied to the decision analysis engine 240. In one embodiment, the new set of rules being applied by the user may have an associated weight value to help determine their priority in making a decision. In another embodiment, an aggregate set of rules are applied to a set of data in order to determine if a favorable result is reached. In one embodiment, the new set of rules may have a retro-active impact on completed and pending work documents. In another embodiment, the new set of rules may only impact the decision analysis engine 240 after the changes have been applied or saved to the centralized or local repository. In yet another embodiment, the new set of rules may only apply towards working document sets 246 without impact to the decision analysis engine 240.

FIG. 7 depicts how wizard 770 enables the user to create or subscribe to decision results and business outcome metrics, as well as to alerts relative to any combination of the decision context itself. This may include for example, but not restricted to these examples, unexpected values being seen by the deployed decisions for a particular contextual field or deviations with respect to an expected statistical distribution of results. Statistics could be performance based or distribution based.

In another embodiment of the present systems the same approach is taken to allow the user to create decision trees, decision tables, decision graphs and scorecards. In yet another embodiment of the present system, the user uses a similar approach, but focuses on the desired decision rather than the cases.

Two examples of specific embodiments will now be presented to demonstrate the present invention. The invention is not defined or limited by these examples, and the examples are merely presented for illustrative purposes.

Example 1

Automobile Insurance—Assess Risk and Determine Quote for Insurance Policy

Figure 8:
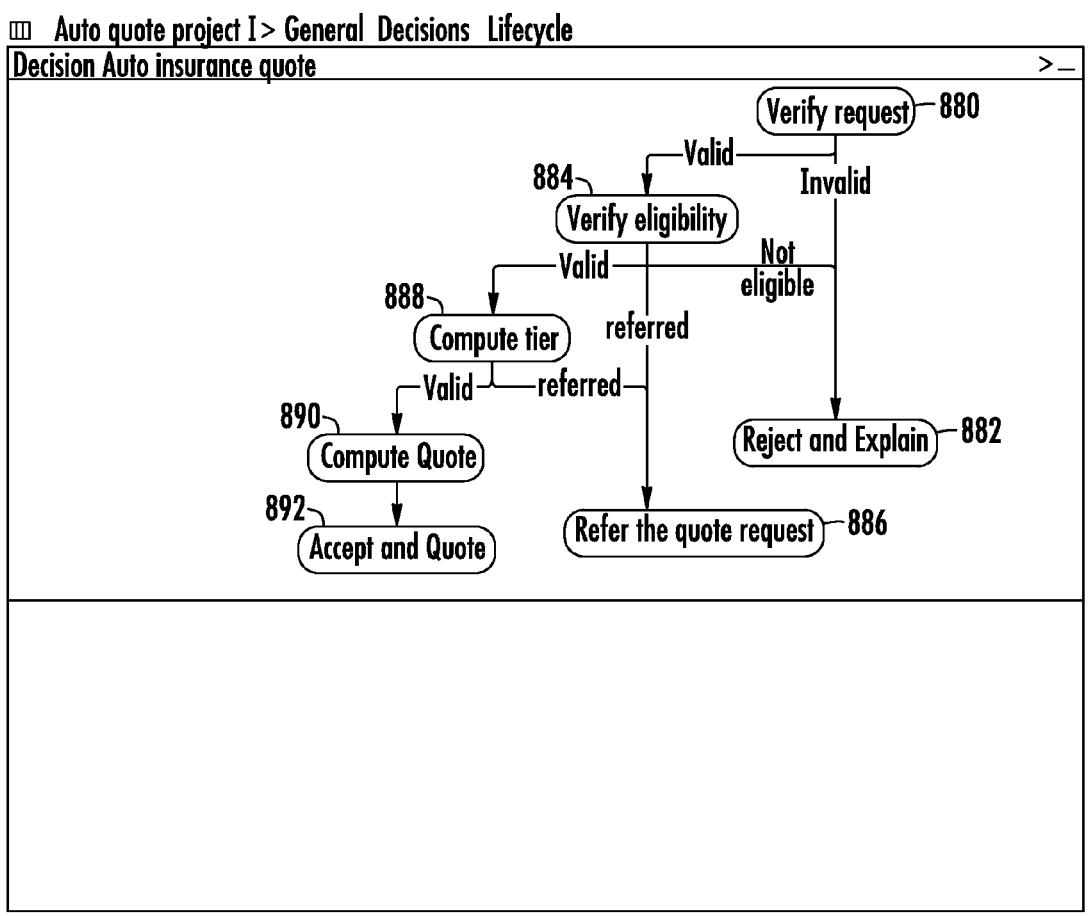
FIG. 8 is a flowchart for the decision process for determining the risk and quote for automobile insurance coverage.

An Automobile Insurance Agent is presented with a client seeking an automobile insurance policy. FIG. 8 is a flowchart for the decision process for determining the risk and quote for automobile insurance coverage. At step 880, the request is verified or checked for completeness. If the conditions are found to be invalid, or not eligible for coverage, at step 882, the client is rejected and notified of the reason. For example, a client may be rejected because there are three or more traffic violations on their driving record.

If the request is valid, at step 884, eligibility is verified. If the Agent feels that a specialist is required to further analyze the case, at step 886, the request is referred to a specialist. If the conditions are found to be not eligible for coverage at this point, the client is rejected and notified of the reason (back at step 882). However, if eligibility is verified, at step 888, the case is processed and the risk assessed. If the risk is very high, the case may be referred to a specialist (step 886) or at step 890, a quote is computed. At step 892, the Agent accepts the decision and quote.

In one embodiment, a business analyst user is presented with a form based interface with an initial set of rules. Examples of the rules may be a driver is considered standard risk if between the ages of 16 and 25 and drives less than 25 miles a day and has one or less violations on their driving record. Also, a driver is considered high risk if between the ages of 16 and 25 and drives greater than 25 miles a day and has one or less violations on their driving record. Next, the forms query the user to input information about the applicant, such as but not limited to, age, sex of driver, how many miles driven in a typical day, driving record and type of vehicle to insure. The user inputs data onto the form with the aid of a wizard such as the applicant is 22 years old, male, drives 40 miles a day, has one accident on their driving record and is seeking insurance for a 1999 model-year minivan. From this information, the system applies the initial set of rules to the data and generates a result. From this example, the applicant is considered high risk and the insurance quote is $2,000 per year.

The result, in this case risk and quote, is made up of a group of rules which can be manipulated in an edit mode. The business analyst user may want to determine which rules influenced the whole decision in order to potentially modify the decision. For example in one embodiment, by clicking on a decision, a decision step, a ruleset or a rule, the form indicates, by highlighting, which fields participate in that piece of decision logic. In this example, the highlighted fields are the driver's age, the mileage driven per day and the amount of violations on their driving record. These are color-coded to reflect their role as input for the selected decision logic; the length of the highlighting reflects the number of rules that use each one of those fields as input. Output fields such as Risk Score are also color-coded to reflect their role in the decision logic and their importance. The user can select one or more fields in the form to highlight and optionally the rules that refer to the field in the condition or action part.

The user may choose to modify a specific rule, create a new rule or add an exception to a rule by entering the red pen editing mode. For this example, the user decides to modify the initial rule to a driver is considered standard risk if between the ages of 16 and 25 and drives less than 50 miles a day and has one or less violations on their driving record. Also, a driver is considered high risk if between the ages of 16 and 25 and drives greater than 50 miles a day and has one or less violations on their driving record. These modifications are made directly in the form by clicking on the fields to add or remove in the current rule, and specifying the appropriate values or ranges of values in-place. The rule set is automatically updated such that the user can visualize the corresponding rule in pseudo-English form. From this information, the system applies the data to this updated, or second set of rules, returning a result. From this example, the applicant is considered standard risk and the insurance quote is now $1,600 per year.

The user may also choose to create a new rule to the existing rule set. This is accomplished in the red pen editing mode by clicking on the appropriate fields and configuring the appropriate values or ranges of values to test against in the context of the form. The tests automatically default to the value of the field for the applicant being underwritten. For example, a new rule may be "If vehicle is older than a 2000 model-year then low risk". The user locates the field "year" in the "vehicle" section of the form and selects it. The user can modify the "vehicle year is 2000" directly in the form using overlaid stickers with this information to "vehicle is older than 2000". The user also selects the decision field to assign a "Low Risk" value in a similar fashion. From these changes, the system will apply the data to this third rule set and calculate a result. In this scenario, the applicant is considered standard risk and the insurance quote is now $1,400 per year.

The user may add an exception to a rule while in red pen edit mode. For example, an exception may be if an applicant is seeking insurance for a minivan model, then a driver is considered standard risk if between the ages of 16 and 25 and drives less than or greater than 50 miles a day and has one or less violations on their driving record. From these changes, the system will apply the data to this updated rule set and calculate a result. In this scenario, the applicant is considered low risk and the insurance quote is now $1,200 per year.

Example 1 Summary

TABLE 1

Summary of Example 1 - Automobile Insurance - Assess Risk and Determine Quote for Insurance Policy

| | |
|---|---|
| Data | 22 years old, male, commutes 40 miles/day, 1 accident on record, seeking insurance for a 1999 minivan |
| Initial Rules | 16-25 years and commutes <25 miles/day and <2 violations on record = standard risk |
| | 16-25 years and commutes >25 miles/day and <2 violations on record = high risk |
| Results | High risk and $2,000/year for insurance |
| * | Modify rule |
| Second Rules | 16-25 years and commutes <50 miles/day and <2 violations on record = standard risk |
| | 16-25 years and commutes >50 miles/day and <2 violations on record = high risk |
| Results | Standard risk and $1,600/year for insurance |
| * | Create new rule |
| Third Rules | Vehicle is older than a 2000 model-year = low risk |
| Results | Standard risk and $1,400/year for insurance |
| * | Add exception rule |

TABLE 1-continued

Summary of Example 1 - Automobile Insurance - Assess Risk and Determine Quote for Insurance Policy

| | |
|---|---|
| Fourth Rules | If seeking insurance for minivan, and 16-25 years and Commutes < or >50 miles/day and <2 violations on record = low risk |
| Results | Low risk and $1,200/year for insurance |

Example 2

Automobile Insurance Redpen Edit Mode

Figure 9:
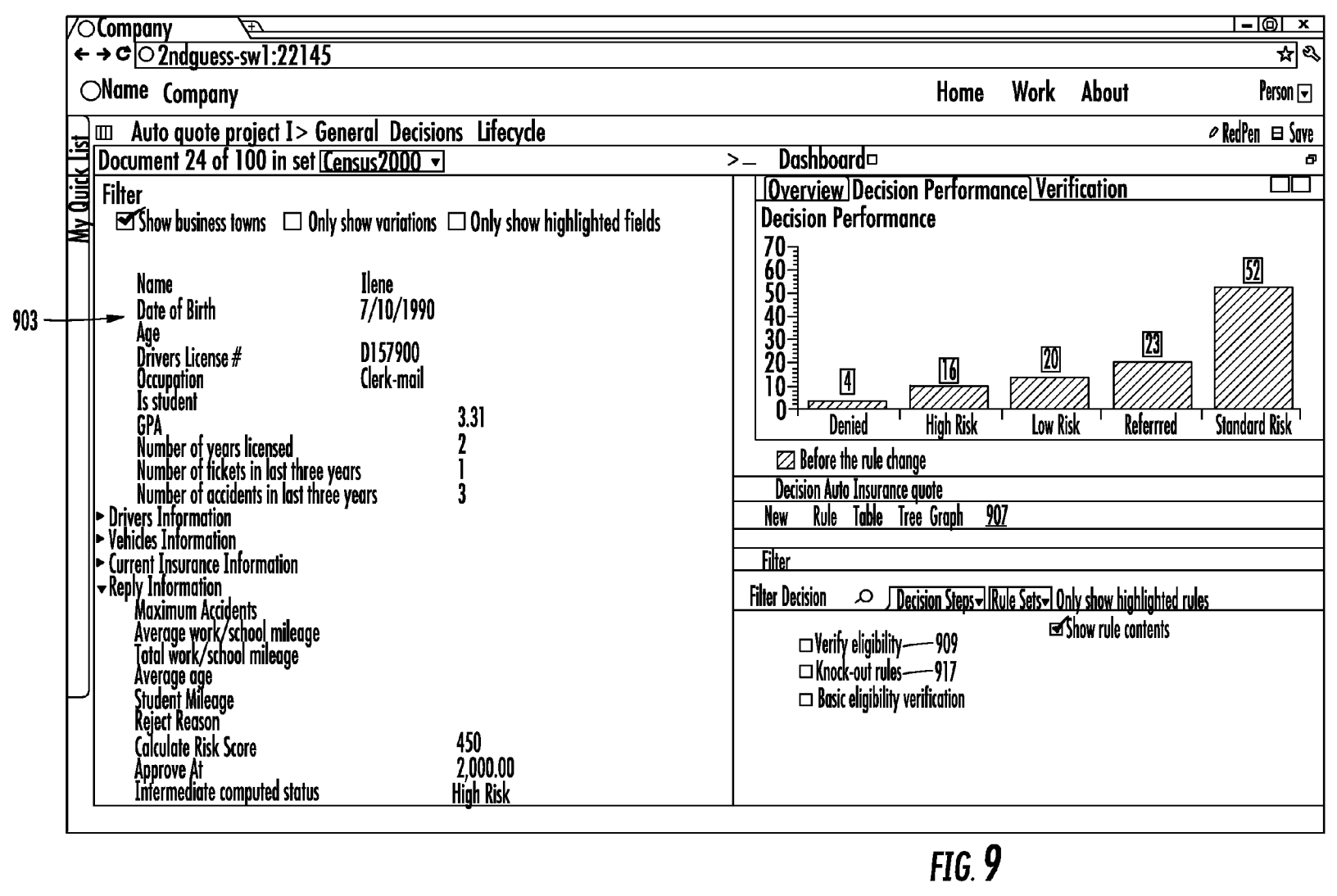

An Automobile Insurance Agent is presented with an applicant seeking an automobile insurance policy. FIG. 9 depicts a form-based interface for the present invention. Referring to FIG. 9, on the left section of the form 903, data is entered about the applicant. In panel Decision 907, the business rules are contained in folders, for example, Verify Eligibility 909. When the Agent clicks on Verify Eligibility 909, a sub-folder, Knock-out Rules 917 appears, but no rules exist yet. The system can be used to create an initial set of rules as illustrated in this example or to modify existing rules.

Figure 10:
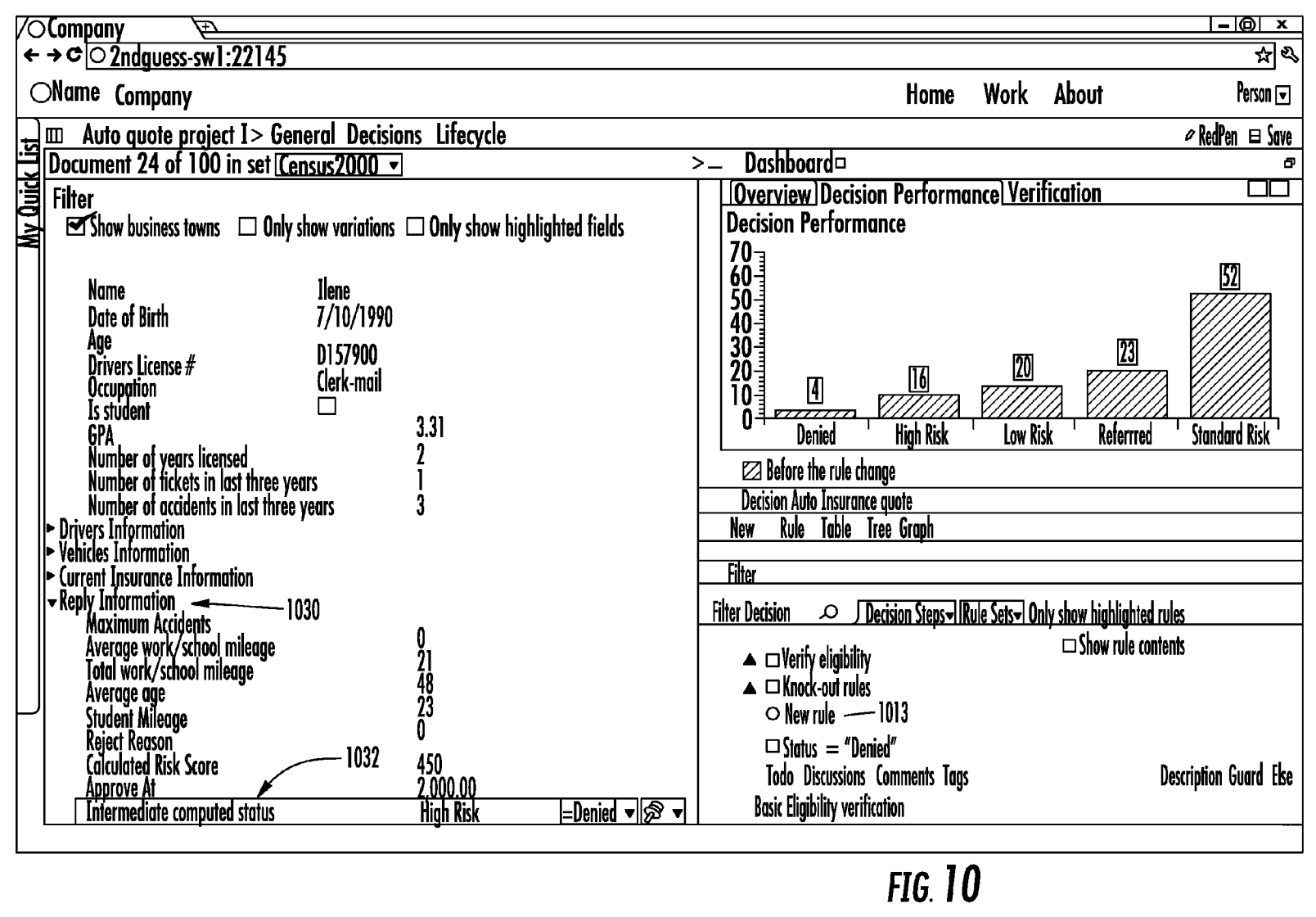

FIG. 10 depicts creating a new rule in the redpen edit mode. Referring to FIG. 10, in Reply Information 1030, the Intermediate computed Status 1032 is High Risk. This means that the applicant is in a high risk group for the insurance policy. From the applicant data, the Agent notices that the applicant's age is 21 years and decides that if an applicant is aged 21 years, the applicant will be denied for insurance coverage instead of being in a high risk category. This business rule does not currently exist so the Agent enters the redpen editing mode to create the new rule.

With the aid of the wizard tool, the Agent clicks on High Risk in the Intermediate computed Status 1032 and selects 'denied'. This updated status is displayed in New Rule 1013. The newly created rule appears with a red marker to indicate that it is not applicable to the current document.

Figure 11:
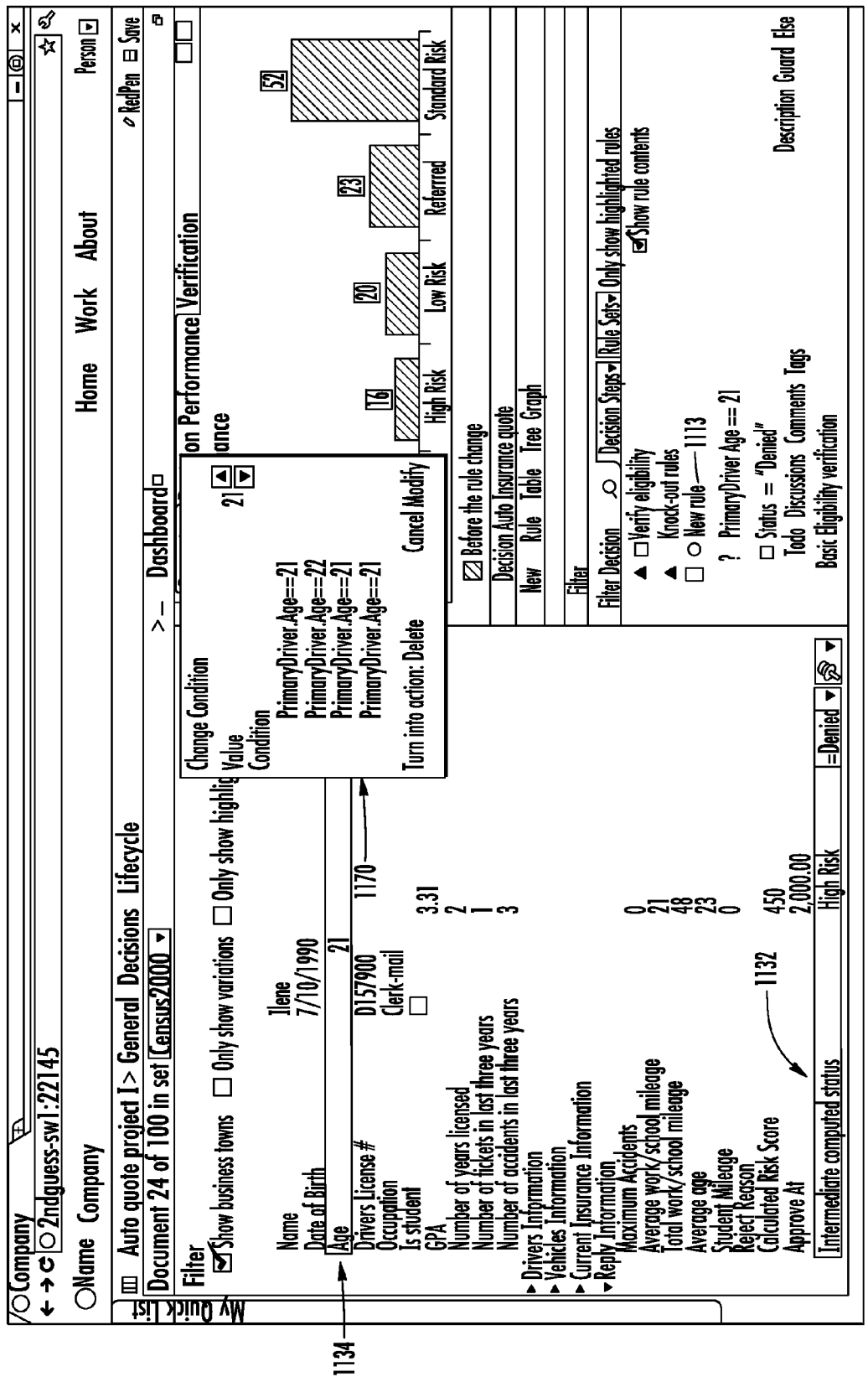
FIG. 11 demonstrates creating conditions to the new rule for the Automobile Insurance Redpen Edit Mode example.

FIG. 11 demonstrates creating conditions to the new rule. Age 1134 indicates by shading that it influences the overall decision as an input field. The Agent clicks on Age 1134 which creates a default condition which is that the age must be 21 to reach the conclusion previously configured, and with the aid of the wizard tool 1170, chooses the condition that if the applicant's age is equal to 21 years, coverage will be denied. In this embodiment, the wizard tool involves clicking on a field to create an additional condition and selecting from drop-down menus at Age 1134 to alter the condition that influences Intermediate Computed Status 1232. The status of the new rule is automatically displayed in New Rule 1113. The rule marker now turns green to indicate that the applicant being reviewed is indeed 21 year-old or less and therefore the rule applies.

Figure 12:
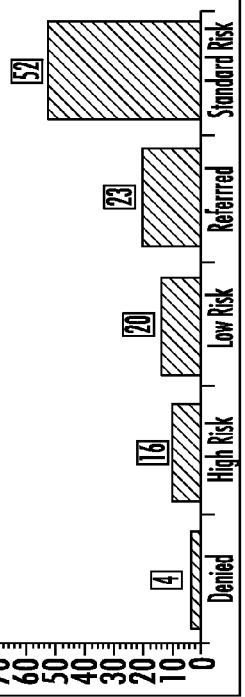
FIG. 12 demonstrates creating additional conditions to the new rule for the Automobile Insurance Redpen Edit Mode example.

The Agent may want to create additional conditions to the new rule. Referring to FIG. 12, Number of Accidents in Last Three Years 1238 indicates that it has not been leveraged yet in the existing decision logic as there is no shading. Again, with the aid of the wizard tool, an additional condition to the new rule may be created. In one embodiment, this involves clicking on Number of Accidents in Last Three Years 1238 to circle it therefore creating a new condition based on the existing value and then selecting from drop-down menus at Number of Accidents in Last Three Years 1238 to alter the conditions thus modifying the new rule. In this scenario, if an applicant has 3 or more accidents in the last three years, and the applicant is aged 21 years, the applicant is denied. This is displayed in New Rule 1213 which is now named by the Agent Deny Young Reckless Drivers 1213. The Agent may continue in this manner clicking on the applicant data to create as many conditions to the new rule as desired. Conditions can be modified or removed in place in the context of the form. The status or output of the new rule is displayed in New Rule 1213 which is named Deny Young Reckless Drivers 1213.

Figure 13:
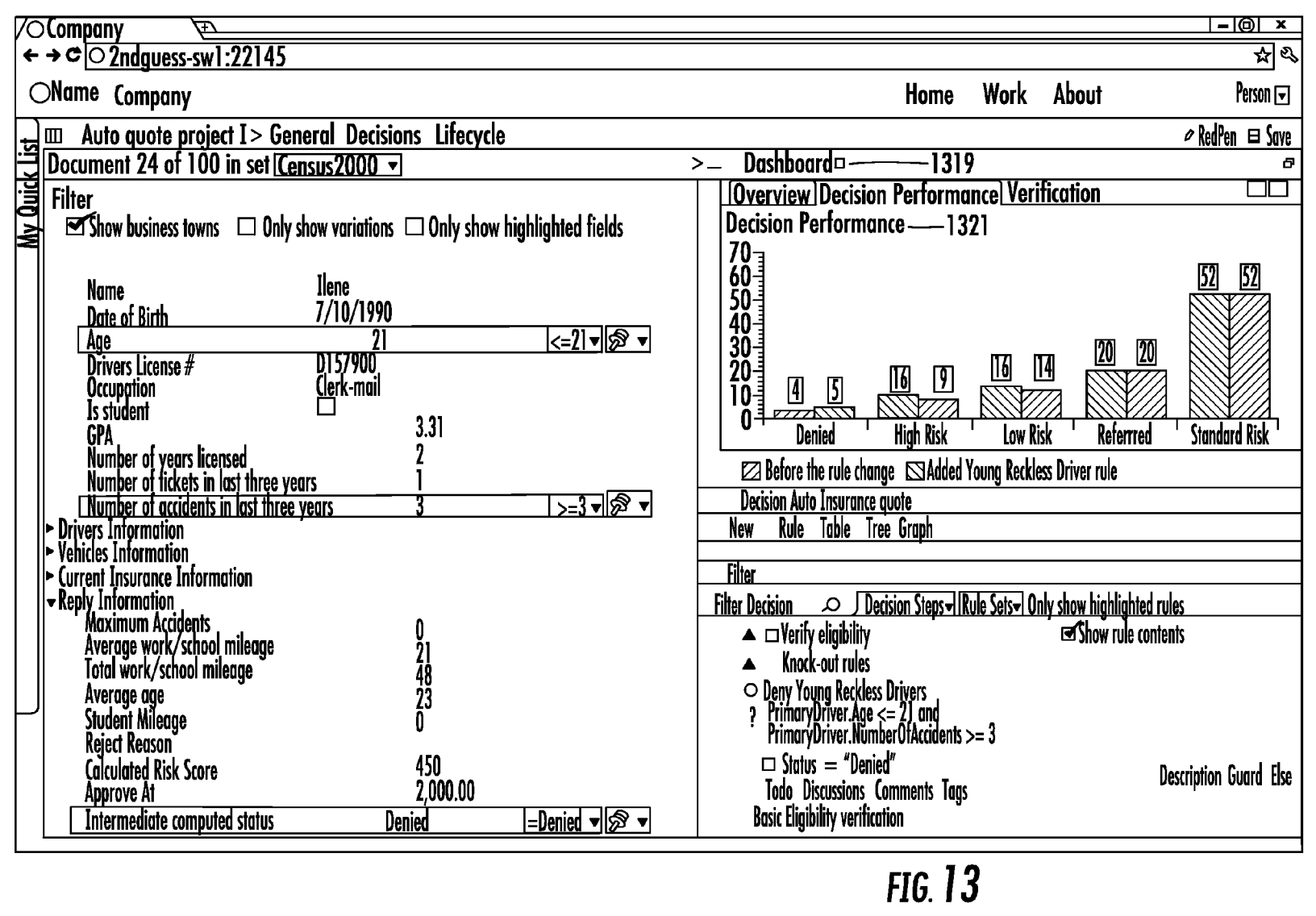

This new rule, Deny Young Reckless Drivers may be compared to the previous rule which was an applicant aged 21 years with three or more accidents on their driving record in the last three years qualifies for insurance in a high risk category. In FIG. 13, the Agent may click on Dashboard 1319 then Decision Performance 1321 to study the metrics of implementing the new rule compared to the previous rule.

Figure 14:
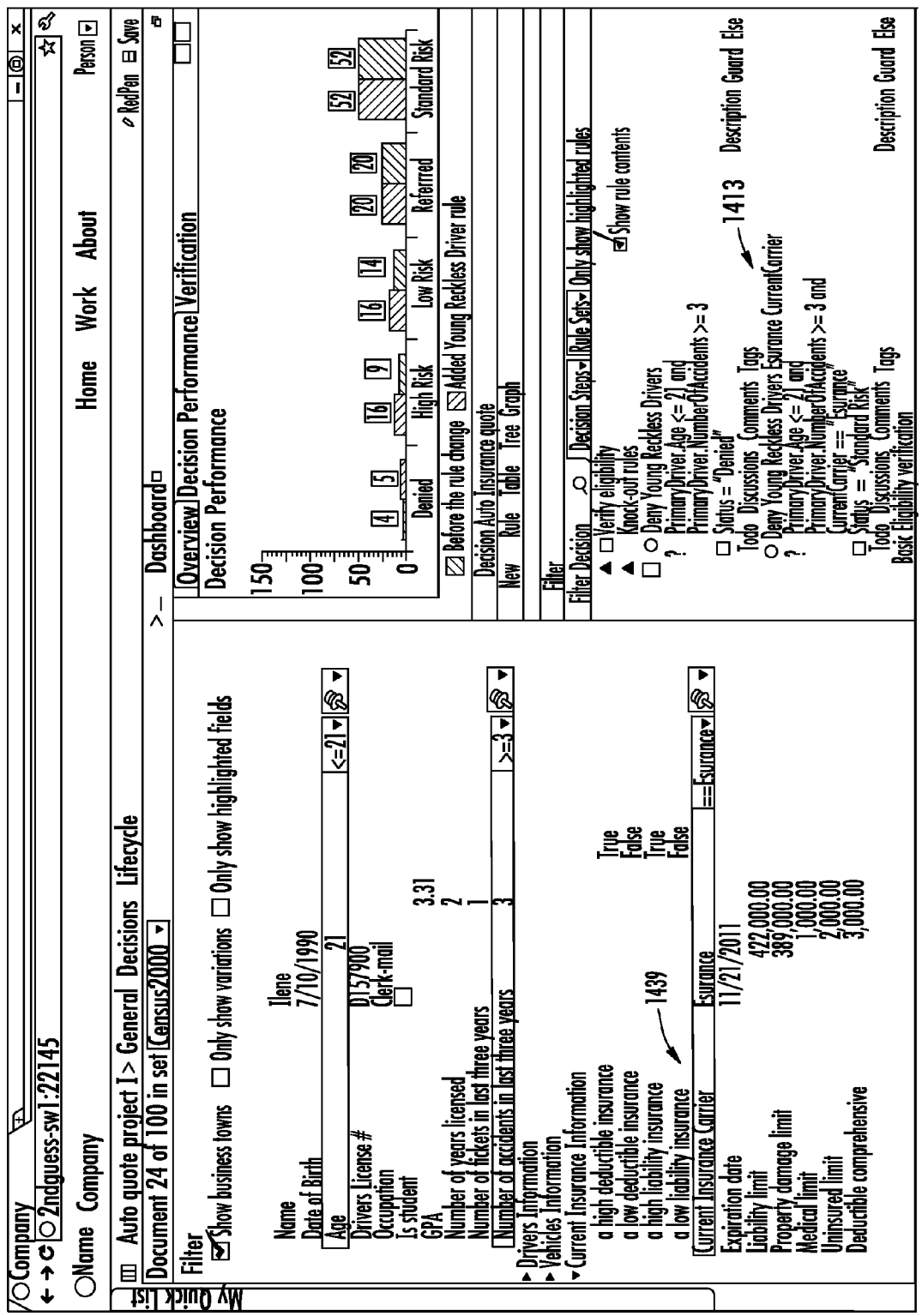
FIG. 14 shows adding an exception rule to the new rule for the Automobile Insurance Redpen Edit Mode example.

In the redpen editing mode, it is also possible to create an exception to the rule. Here, the new rule is an applicant aged 21 years with three or more accidents on their driving record in the last three years is denied coverage. The Agent may want to capture specific business from a competitor and therefore creates an exception to this rule. For example, referring to FIG. 14, the Agent may click on Current Insurance Carrier 1439 and discover the applicant's current insurance provider is, for example, Esurance. The Agent enters the redpen editing mode, selects create an exception, then clicks on Current Insurance Carrier 1439. With the guidance of the wizard tool, an exception to the new rule is automatically created. In one embodiment, this involves selecting from drop-down menus at Current Insurance Carrier 1439 in the form to alter the conditions thus creating an exception to the new rule. With this exception, the new rule is now an applicant aged 21 years or less with three or more accidents on their driving record in the last three years with Esurance as their current provider, qualifies for insurance in a standard risk category. This is displayed in New Rule 1413 which is now named Deny Young Reckless Drivers Esurance Current Carrier 1413.

A significant feature of the current invention is that rules are created dynamically without custom coding and within the context of data. Typically in the prior art, rules are created in the context of the rules relating to the rules, not the actual data, which requires the Agent to understand an abstract object model and to navigate it. In the present invention, a new rule may be created and modified by clicking on the data then the new rule is displayed. New rules can be graphically manipulated into the form or entered manually in the rules editor. Lastly, new rules are created by highlighting or clicking particular aspects of information as opposed to focusing on the syntax of if/then statements.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed is:

1. A method of creating decision logic, the method comprising the steps of:

receiving a first set of rules for the decision logic;

receiving data, storing the data in computer memory;

generating a first decision for a user, wherein the first decision is based at least in part on the data;

receiving input from the user for editing the first set of rules to create a new set of rules for the decision logic in the context of the data; and generating a final decision derived at least in part from the data using the new set of rules.

2. The method of claim 1, further comprising the steps of:

analyzing the first set of rules promptly to identify potential logic issues; and alerting the user of the potential logic issues.

3. The method of creating decision logic of claim 1, wherein the edit by the user to obtain a final decision is done by at least one of (i) modifying a rule in the first set of rules, (ii) creating another rule and adding it to the first set of rules and (iii) making an exception to a rule in the first set of rules.

4. The method of creating decision logic of claim 1, within the first set of rules for the decision logic is inputted by at least one user, a program, a process or a database.

5. The method of creating decision logic of claim 1, further comprising the step of utilizing a decision analysis engine to interface with working documents and existing decision logic.

6. The method of creating decision logic of claim 1, further comprising the step of providing the user with a form for inputting the data and the new set of rules for the decision logic.

7. The method of creating decision logic of claim 6, wherein the data includes a range or set of values in contextual fields of the form, and wherein the range of values is used for creating the new set of rules for the decision logic.

8. The method of creating decision logic of claim 6, further comprising the step of electronically annotating the form, wherein the electronic annotation is circling, clicking, typing or highlighting.

9. The method of creating decision logic of claim 1, wherein the data is aggregated from multiple users.

10. The method of creating decision logic of claim 1, further comprising the steps of:

collecting statistics related to the data; and displaying the statistics to the user.

11. The method of creating decision logic of claim 1, further comprising the step of creating decision results and business outcome metrics.

12. The method of creating decision logic of claim 1, further comprising the step of determining role and relevance of the role of a particular contextual field containing the data.

13. The method of creating decision logic of claim 1, wherein the second set of rules are created without custom coding.

14. The method of creating decision logic of claim 1, wherein the second set of rules are created using near natural language.

15. The method of creating decision logic of claim 1, wherein the second set of rules are created using at least in part a list of predetermined logical expressions.

16. A method of modifying decision logic, the method comprising the steps of:

receiving data;

receiving annotating, or selecting via a user interface, the user interface displaying the user input-data;

using the annotating or selecting to edit a first set of rules to create a second set of rules in the context of the data;

storing the second set of rules in computer memory;

executing program logic to aggregate the data, the first set of rules, and the second set of rules to generate an output result.

17. The method of modifying decision logic of claim 16, wherein the second set of rules is created without custom coding.

18. The method of modifying decision logic of claim 16, wherein the second set of rules is created using near natural language.

19. The method of modifying decision logic of claim 16, wherein the second set of rules is created using at least in part a list of predetermined logical expressions.

20. The method of modifying decision logic of claim 16, wherein the edit by the user to obtain a final decision is done by at least one of (i) modifying a rule in the first set of rules, (ii) creating another rule and adding it to the first set of rules and (iii) making an exception to a rule in the first set of rules.

21. The method of modifying decision logic of claim 16, wherein usage and relevance information for each field indicated on a form is based on selected decision logic.

22. The method of modifying decision logic of claim 16, wherein the second set of rules indicate usage and relevance information for one or more selected fields in a form.

23. The method of modifying decision logic of claim 16, wherein a status of second set of rules are displayed based on the data.

* * * * *